(12) United States Patent
Venkataraghavan

(10) Patent No.: US 12,342,402 B2
(45) Date of Patent: Jun. 24, 2025

(54) SYSTEM, METHOD, AND COMPUTER PROGRAM FOR MANAGING CONFIGURATION OF A NETWORK NODE

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/012,507

(22) PCT Filed: Nov. 23, 2022

(86) PCT No.: PCT/US2022/050849
§ 371 (c)(1),
(2) Date: Dec. 22, 2022

(87) PCT Pub. No.: WO2024/112334
PCT Pub. Date: May 30, 2024

(65) Prior Publication Data
US 2024/0244686 A1 Jul. 18, 2024

(51) Int. Cl.
H04W 64/00 (2009.01)
H04W 76/15 (2018.01)
H04W 76/20 (2018.01)

(52) U.S. Cl.
CPC ......... H04W 76/15 (2018.02); H04W 64/00 (2013.01); H04W 76/20 (2018.02)

(58) Field of Classification Search
None
See application file for complete search history.

(56) References Cited

U.S. PATENT DOCUMENTS 10,827,423 B1 * 11/2020 Manganiello ......... H04W 48/20
2007/0189252 A1 8/2007 Kawakami
2008/0069008 A1 3/2008 Park et al.

FOREIGN PATENT DOCUMENTS

WO 2022/026056 A1 2/2022

OTHER PUBLICATIONS

International Search Report issued Feb. 28, 2023 in Application No. PCT/US22/50849.
Written Opinion issued Feb. 28, 2023 in Application No. PCT/US22/50849.

* cited by examiner

Primary Examiner — Suhail Khan
(74) Attorney, Agent, or Firm — Sughrue Mion, PLLC

(57) ABSTRACT

Provided are apparatus, method, and device for managing configuration of a network node. The apparatus comprising: a memory storing instructions; and at least one processor configured to execute the instructions to: determine whether or not a node colocation occurs between a first node and a second node; based on determining that the node colocation occurs, determine a dual connectivity state associated with the first node; based on determining that the dual connectivity state is a disabled state, enable the dual connectivity state; and based on determining that no node colocation occurs, disable the dual connectivity state.

20 Claims, 12 Drawing Sheets

| State | Recommended Icon Indicator |
|---|---|
| Idle or connected to LTE cell not supporting NSA | 4G |
| Idle or connected to LTE cell supporting NSA and no detection of 5G coverage | 5G |
| Connected to LTE only under LTE cell supporting NSA and detection of 5G coverage | 5G |
| Idle under LTE cell supporting NSA and detection of 5G coverage | 5G |
| Connected to LTE + 5G under LTE cell supporting NSA | 5G |

FIG. 2 (Related Art)

| eNodeB ID | Cell ID | Dual Connectivity State | Dual Connectivity Profile ID | Dual Connectivity Deployment Type | Minimal Dual Connectivity Configuration |
|---|---|---|---|---|---|
| eNB 1 | Cell 1 | Enabled | Profile A1 | Sub-6 | Config. A |
| eNB 1 | Cell 1 | Enabled | Profile B1 | mmWave | Config. B |
| eNB 1 | Cell 2 | Disabled | Profile A2 | Sub-6 | Config. C |
| eNB 2 | Cell 1 | Enabled | Profile A2 | Sub-6 | Config. D |
| ... | ... | ... | ... | ... | ... |
| eNB N | Cell N | N | Profile N | Type N | Config. N |

FIG. 4

| Dual Connectivity Profile ID | Dual Connectivity Deployment Type | Parameter 1 | ... | Parameter N |
|---|---|---|---|---|
| Profile A1 | Sub-6 | Config. 1 | ... | Config. 1N |
| Profile A2 | Sub-6 | Config. 2 | ... | Config. 2N |
| Profile B1 | mmWave | Config. 3 | ... | Config. 3N |
| ... | ... | ... | ... | ... |
| Profile N | Type N | Config. X | ... | Config. XN |

FIG. 5

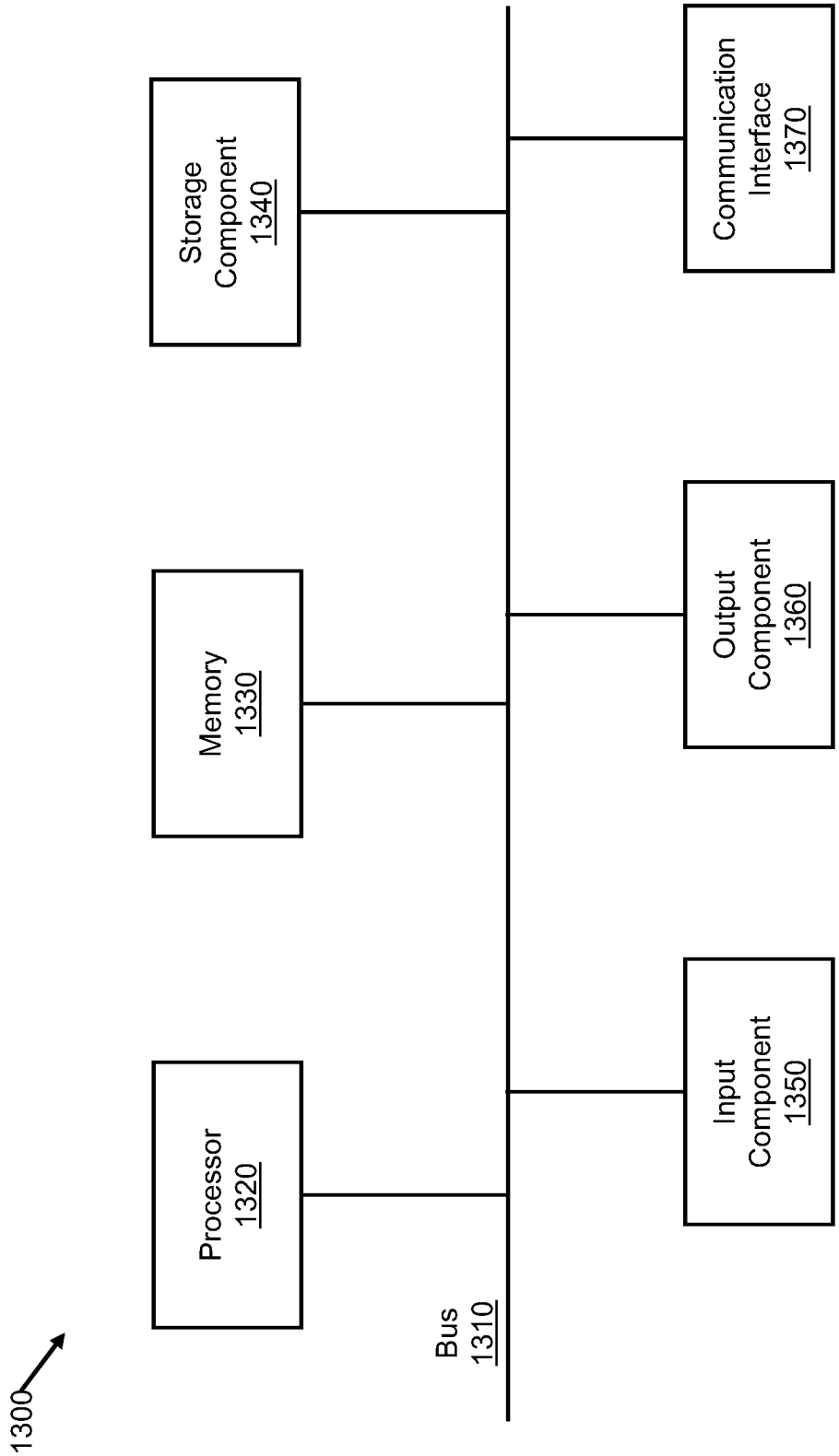

SYSTEM, METHOD, AND COMPUTER PROGRAM FOR MANAGING CONFIGURATION OF A NETWORK NODE

CROSS REFERENCE TO RELATED APPLICATIONS

This Application is a National Stage of International Application No. PPCT/US2022/050849 filed Nov. 23, 2022.

1. FIELD

Apparatuses and methods consistent with example embodiments of the present disclosure relate to telecommunication technologies and, more particularly, relate to apparatuses and methods for managing configuration of a network node in a telecommunication system.

2. DESCRIPTION OF RELATED ART

Related art telecommunication technologies may allow a user equipment (UE) to access multiple network systems each of which has a different technology. For instance, an E-UTRAN New Radio Dual Connectivity (ENDC) technology may allow a UE to access both a $4^{th}$ generation (4G) Long-Term Evolution (LTE) network system and a $5^{th}$ generation (5G) new radio (NR) network system. As discussed below, the related art technologies have several drawbacks.

Firstly, in the related art, the UE may present an icon indicator of a technology but may not be able to actually utilize any of the associated services. For instance, the UE may present a 5G icon indicator without being able to actually utilize any of the 5G services. This may cause confusion to some of the users of the network, and in some cases, may result in damage of the network operator's reputation since some of the users may think that the network operator is providing false information and/or the services provided by the network operator do not have good quality.

Further, in the related art, a user (e.g., a network operator, a vendor, etc.) may be required to manually mange configuration of network nodes (e.g., base stations, etc.). For instance, said user may need to manually monitor status of multiple network nodes, to manually determine which technology a network node(s) can utilize, to manually determine whether or not condition(s) for utilizing the technology has been fulfilled, and to manually configure the associated network node(s) such that the UE can appropriately utilize the associated network service(s). These processes in the related art are burdensome to the user in managing the network nodes, particularly when the number of network nodes is significant and/or when the roll-out speed of the network nodes is fast.

Accordingly, whenever there is a delay in configuring or updating the configuration of the network node(s), the UE may not be able to utilize the associated service(s) even if the network infrastructures have been installed and are ready to be utilized.

Furthermore, configuration errors may occur during the manual management of the configuration of the network node(s). For instance, the user may unintentionally configure a sub-6 5G base station with a configuration of a mmWave 5G base station. In that case, in addition to the UE being unable to utilize the service(s) that is supposed to be provided by the sub-6 5G base station, it will also be time and cost consuming for the user to identify the root cause of the issue and to reconfigure the associated base station thereafter.

SUMMARY

According to embodiments, apparatuses, methods, and devices are provided for automatically manage the configuration of one or more network nodes, according to the real-time or near real-time system status. Further, example embodiments of the present disclosure provide a system and method to automatically check for abnormalities in configuration of one or more network nodes, and to automatically address the abnormalities, if any. Furthermore, example embodiments of the present disclosure provide a system and method to automatically determine an alternative network node based on determining that a UE is capable of utilizing multiple technologies but there is no node colocation detected. Accordingly, example embodiments of the present disclosure avoid operational delay due to misconfiguration or inefficient task management. Further, the utilization of possible network nodes for dual connectivity may be maximized. Accordingly, the possibility of the icon indicator being inaccurate can be effectively reduced.

According to embodiments, an apparatus includes: a memory storing instructions; and at least one processor configured to execute the instructions to: determine whether or not a node colocation occurs between a first node and a second node; based on determining that the node colocation occurs, determine a dual connectivity state associated with the first node; based on determining that the dual connectivity state is a disabled state, enable the dual connectivity state; and based on determining that no node colocation occurs, disable the dual connectivity state.

The at least one processor may be further configured to execute the instructions to: obtain a first configuration profile associated with the first node; and obtain a second configuration profile associated with the second node.

The first configuration profile may include a minimal dual connectivity configuration requirement of the first node, the second configuration profile may include a dual connectivity configuration of the second node, and the at least one processor may be configured to execute the instructions to determine whether or not the node colocation occurs by: determining whether or not a distance between the first node and the second node is within a first predetermined threshold; based on determining that the distance is within the first predetermined threshold, determining whether or not a technology type of the second node is different from a technology type of the first node; based on determining that the technology type of the second node is different from the technology type of the first node, determining whether or not the dual connectivity configuration of the second node satisfies the minimal dual connectivity configuration requirement; based on determining that the dual connectivity configuration of the second node satisfies the minimal dual connectivity configuration requirement, determining that the node colocation occurs; and based on determining that the distance is not within the first predetermined threshold, based on determining that the technology type of the second node is not different from the technology type of the first node, or based on determining that the dual connectivity configuration of the second node does not satisfy the minimal dual connectivity configuration requirement, determining that no node colocation occurs.

The first configuration profile may include a flag defining the dual connectivity state associated with the first node, and the at least one processor may be configured to execute the instructions to determine the dual connectivity state by determining a state of the flag.

Further, the at least one processor may be configured to execute the instructions to: determine whether or not an information in the first configuration profile is consistent with an information in the second configuration profile; and based on determining that the information in the first configuration is not consistent with the information in the second configuration profile, update the information of the first configuration profile according to the information in the second configuration profile.

Furthermore, the at least one processor may be configured to execute the instructions to: determine whether or not a third node is available; based on determining that the third node is available, determine a dual connectivity state associated with the third node; and based on determining that the dual connectivity state associated with the third node is a disabled state, enable the dual connectivity state associated with the third node.

The at least one processor may be configured to execute the instructions to determine whether or not the third node is available by: comparing a coordinate of the third node to a coordinate of the second node to determine a distance between the third node and the second node; determining whether or not the distance between the third node and the second node is within a second predetermined threshold; based on determining that the distance is within the second predetermined threshold, determining whether or not a technology type of the third node is different from a technology type of the second node; and based on determining that the technology type of the third node is different from the technology type of the second node, determining that the third node is available.

Further, the at least one processor may be configured to execute the instructions to enable the dual connectivity state associated with the third node by: obtaining a third configuration profile associated with the third node, wherein the third configuration profile comprises a flag defining the dual connectivity state associated with the third node; determining a state of the flag; and based on determining that the flag has a disabled state, enabling the flag.

Furthermore, the at least one processor may be configured to execute the instructions to: determine whether or not an information in the third configuration profile is consistent with an information in the second configuration profile; and based on determining that the information in the third configuration is not consistent with the information in the second configuration profile, update the information of the third configuration profile according to the information in the second configuration profile According to embodiments, a method, performed by at least one processor, includes: determining whether or not a node colocation occurs between a first node and a second node; based on determining that the node colocation occurs, determining a dual connectivity state associated with the first node; based on determining that the dual connectivity state is a disabled state, enabling the dual connectivity state; and based on determining that no node colocation occurs, disabling the dual connectivity state.

The method may further include: obtaining a first configuration profile associated with the first node; and obtaining a second configuration profile associated with the second node.

The first configuration profile may include a minimal dual connectivity configuration requirement of the first node, the second configuration profile may include a dual connectivity configuration of the second node, and the determining whether or not the node colocation occurs may include: determining whether or not a distance between the first node and the second node is within a first predetermined threshold; based on determining that the distance is within the first predetermined threshold, determining whether or not a technology type of the second node is different from a technology type of the first node; based on determining that the technology type of the second node is different from the technology type of the first node, determining whether or not the dual connectivity configuration of the second node satisfies the minimal dual connectivity configuration requirement; based on determining that the dual connectivity configuration of the second node satisfies the minimal dual connectivity configuration requirement, determining that the node colocation occurs; and based on determining that the distance is not within the first predetermined threshold, based on determining that the technology type of the second node is not different from the technology type of the first node, or based on determining that the dual connectivity configuration of the second node does not satisfy the minimal dual connectivity configuration requirement, determining that no node colocation occurs.

Further, the first configuration profile may include a flag defining the dual connectivity state associated with the first node, and the determining the dual connectivity state may include determining a state of the flag.

The method may further include: determining whether or not an information in the first configuration profile is consistent with an information in the second configuration profile; and based on determining that the information in the first configuration is not consistent with the information in the second configuration profile, updating the information of the first configuration profile according to the information in the second configuration profile.

Furthermore, the method may further include: determining whether or not a third node is available; based on determining that the third node is available, determining a dual connectivity state associated with the third node; and based on determining that the dual connectivity state associated with the third node is a disabled state, enabling the dual connectivity state associated with the third node.

The determining whether or not the third node is available may include: comparing a coordinate of the third node to a coordinate of the second node to determine a distance between the third node and the second node; determining whether or not the distance between the third node and the second node is within a second predetermined threshold; based on determining that the distance is within the second predetermined threshold, determining whether or not a technology type of the third node is different from a technology type of the second node; and based on determining that the technology type of the third node is different from the technology type of the second node, determining that the third node is available.

The enabling the dual connectivity state associated with the third node may include: obtaining a third configuration profile associated with the third node, wherein the third configuration profile comprises a flag defining the dual connectivity state associated with the third node; determining a state of the flag; and based on determining that the flag has a disabled state, enabling the flag.

Furthermore, the method may further include: determining whether or not an information in the third configuration profile is consistent with an information in the second configuration profile; and based on determining that the information in the third configuration is not consistent with the information in the second configuration profile, updating the information of the third configuration profile according to the information in the second configuration profile.

According to embodiments, a non-transitory computer-readable recording medium having recorded thereon instructions executable by at least one processor to cause the at least one processor to perform a method including: determining whether or not a node colocation occurs between a first node and a second node; based on determining that the node colocation occurs, determining a dual connectivity state associated with the first node; based on determining that the dual connectivity state is a disabled state, enabling the dual connectivity state; and based on determining that no node colocation occurs, disabling the dual connectivity state.

Further, the non-transitory computer-readable recording medium may have recorded thereon instructions executable by the at least one processor to cause the at least one processor to perform the method which may further include: obtaining a first configuration profile associated with the first node; and obtaining a second configuration profile associated with the second node.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 2 illustrates a table of conditions for displaying icon indicators in the related art;

FIG. 4 illustrates an example table containing a plurality of Master Cell Group (MCG) configuration profiles, according to one or more embodiments;

FIG. 5 illustrates an example table containing a plurality of Secondary Cell Group (SCG) configuration profiles, according to one or more embodiments;

FIG. 13 is a diagram of example components of a device according to one or more embodiment.

DETAILED DESCRIPTION

Figure 1:
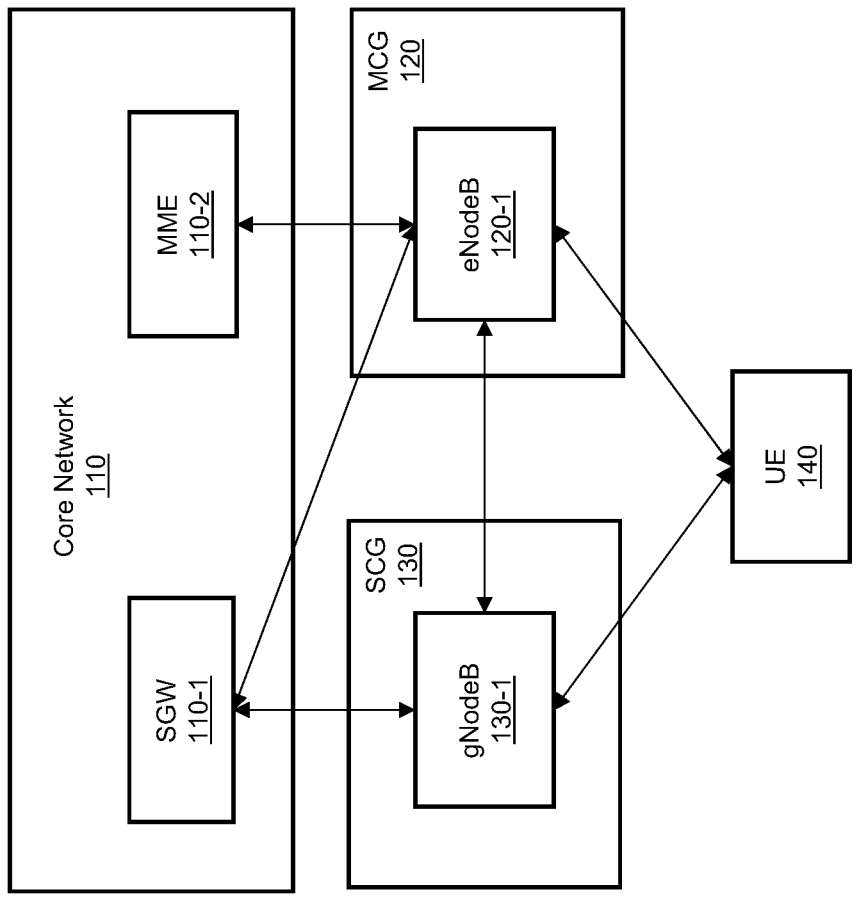
FIG. 1 illustrates an example system diagram in the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

In addition, the terms "node", "network node", and "network element", as used herein, may refer to one or more hardware components constituting a base station; a software which, when being executed, performs one or more operations of a base station; or a combination of hardware and software, unless explicitly stated otherwise. Further, the term "user" used herein may refer to a network operator, a vendor, a service provider, a network user, or any suitable personnel associated with a node, unless explicitly stated otherwise.

Further, although only one master cell group (MCG), one secondary cell group (SCG), and one user equipment (UE) are described herein below, it is apparent that more than one MCG, more than one SCG, and/or more than one UE can be included in any of the example embodiments described herein.

Furthermore, although the example embodiments of the present disclosure are described herein in relation to interoperability among a 4G LTE network system and a 5G NR network system, it is contemplated that the present disclosure is similarly applicable to any other suitable multi-connectivity technology. For instance, the present disclosure may also be applicable to interoperability among a 4G network system and a $6^{th}$ generation (6G) network system, among a 5G network system and a 6G network system, and the like.

In related art, a user equipment (UE) may access both LTE network system and 5G network system when applicable. For instance, in 5G non-standalone (NSA) mode, a technology known as E-UTRAN New Radio Dual Connectivity (ENDC) is provide, which may allow a UE to access both LTE network system and 5G network system under certain circumstances.

Specifically, in 5G NSA mode of the related art, two cell groups are utilized: a master cell group (MCG) and a secondary cell group (SCG). MCG comprises cells formed by one or more 4G LTE base stations (eNodeB), while SCG comprises cells formed by one or more 5G NR base stations (gNodeB). Accordingly, in 5G NSA mode, an eNodeB is also known as "master node" and a gNodeB is also known as "secondary node". In ENDC, the UE performs initial registration and connection to the master node of MCG, and the master node may then enable the UE to connect to a secondary node of SCG when applicable.

FIG. 1 illustrates an example system diagram 100 in the related art. Referring to FIG. 1, under 5G NSA mode in the related art, system 100 may comprise a core network 110, a master cell group (MCG) 120, a secondary cell group (SCG) 130, and a user equipment (UE) 140.

The core network 110 may be an evolved packet core (EPC), and may comprise a serving gateway (SGW) 110-1 and a mobility management entity (MME) 110-2. The SGW 110-1 acts as a user plane functional entity of core network 110, and is mainly responsible for handling user data traffic such as transporting data packets from core network 110 to UE 140 and vice versa. On the other hand, the MME 110-2 acts as control plane functional entity of core network 110, and is responsible for handling user authentication, authorization, session management, and protocols managements, which are required for connection establishment.

The MCG 120 may comprise one or more eNodeB 120-1 (i.e., 4G LTE base station), and the SCG 130 may comprise one or more gNodeB 130-1 (i.e., 5G NR base station). The eNodeB 120-1 is communicatively coupled to the SGW 110-1 and MME 110-2 of core network 110, and is also communicatively coupled to the gNodeB 130-1 of SCG 130. On the other hand, the gNodeB 130-1 is communicatively coupled to the SGW 110-1 of core network 110 and to the eNodeB 120-1 of MCG 120.

In operation, the UE 140 may first initiate connection to eNodeB 120-1, since only eNodeB 120-1 has connection to MME 110-2 which provides information and operations for connection establishment. After the connection is established, eNodeB 120-1 may transmit data packets from SGW 110-1 to UE 140. In the meantime, eNodeB 120-1 may determine that the UE 140 is 5G-capable (i.e., the UE 140 may be connected to a gNodeB) and may then indicate to UE 140 that the eNodeB 120-1 supports 5G NSA mode. Accordingly, the UE 140 may utilize said eNodeB 120-1 to establish a connection to a gNodeB. At this point, UE 140 may present a 5G icon indicator to notify to the associated user that the UE has been connected to an eNodeB which support 5G NSA mode.

Subsequently, UE 140 may send to the eNodeB 120-1 a request for connecting to a gNodeB. Accordingly, eNodeB 120-1 may provide to the UE 140 the information of the supported 5G technology and the requirement for initiating a connection associated thereto (e.g., minimal ENDC requirement, etc.). Upon receipt of the information from the eNodeB 120-1, the UE 140 may search for any nearby gNodeB which fulfills the requirement. Upon detecting a suitable gNodeB (e.g., gNodeB 130-1, etc.), the UE 140 may send the information of gNodeB 130-1 (e.g., node ID, etc.) to eNodeB 120-1. Accordingly, eNodeB 120-1 may obtain the configuration information of gNodeB 130-1 and provide said configuration information to the UE 140 via a RRC Connection Reconfiguration process (e.g., send a RRC Connection Reconfiguration message comprising necessary information to UE 140, etc.). Upon successful RRC Connection Reconfiguration process, a connection may be established between UE 140 and gNodeB 130-1.

As described above, the related art dual connectivity technology of 5G NSA mode provides an intermediary step to full 5G standalone (SA) mode (in which the UE can connect to a 5G network system without any need of 4G network system), which in turn reduces costs (e.g., CAPEX, OPEX, etc.) for operators in deploying 5G services and allows faster 5G network roll out. Nevertheless, in 5G NSA mode, the UE is required to firstly connect to a LTE eNodeB of a MCG, before establishing a connection with a 5G gNodeB of a SCG. Accordingly, the 5G NSA mode and the associated dual connectivity technology (e.g., ENDC, etc.) in the related art has the following drawbacks and weaknesses.

Firstly, an icon indicator associated with a technology (e.g., LTE, 5G, etc.) presented on the UE may be confusing and misleading. Specifically, in the related art, there is no standardized requirement in the conditions for displaying an icon indicator, and a user (e.g., a network operator, vendor, etc.) may freely define the condition(s) for displaying an icon indicator on the UE.

For instance, FIG. 2 illustrates a table of conditions for displaying 4G icon indicator and 5G icon indicator, recommended (but are not required) by Global System for Mobile Communication Association (GSMA). Referring to FIG. 2, the only time a 5G-capable UE would show a 4G icon indicator is when the UE is connected to an eNodeB that does not support 5G NSA mode. Namely, under the conditions illustrated in FIG. 2, even if an eNodeB (to which the UE is connected) does not actually detect a 5G coverage and/or does not actually utilize a 5G service, as long as the eNodeB supports 5G NSA mode, the eNodeB may notify the UE so that a 5G icon indicator is presented thereon.

However, another user (e.g., a customer of the network service, etc.) may not be aware of the condition or the reason of the 5G icon indicator being displayed, and may misunderstand that the displayed 5G icon indicator implies that the UE is utilizing a 5G service. In that case, since the UE does not necessarily utilize any 5G service, the actual performance of the connected network system may not reach the user's expectation (e.g., the actual network system may have higher latency, lower throughput speed, etc.), which may in turn result in the user's disappointment and dissatisfaction toward the network operator.

In addition, in the related art, in order to allow the UE to utilize a technology (e.g., 5G service) via dual connectivity, the network operator (or any other suitable personnel) is required to manually manage the configuration of the associated network nodes. As described above, in order to establish a connection to a gNodeB of SCG, the UE is required to firstly connect to an eNodeB of MCG, so that the eNodeB can provide the information of the supported technology and the associated requirement to the UE to allow the UE to then search for a suitable gNodeB based on the information provided by the eNobdeB. In this regard, the eNodeB may only provide said information to the UE based on determining that the dual connectivity state (e.g., an ENDC state, etc.) has been enabled. In this regard, even if the infrastructures (e.g., antenna, cabling, etc.) of the network nodes (e.g., eNodeB, gNodeB, etc.) have been deployed and ready to operate, if the network operator does not timely enable the dual connectivity state of the eNodeB (e.g., the operator forgets to enable the dual connectivity state, there are too many network nodes to be managed and there is a delay in configuring the dual connectivity state, etc.), the UE will not be able to utilize the network nodes via dual connectivity.

In addition, human errors may also being made by the network operator during manual management of the configuration of network nodes. For instance, an eNodeB may support only sub-6 5G technology, but the user (i.e., employee of network operator) has accidentally configured the eNodeB based on configuration of mmWave 5G technology. Similarly, the user may unintentionally disable a dual connectivity state of a network node while the network node is ready to operate via dual connectivity. In that case, not only is the UE unable to utilize the 5G technology via the eNodeB, it will also be time and cost consuming for the user to troubleshoot the root cause of the abnormalities and to address the same accordingly.

Example embodiments of the present disclosure provide a system and method to automatically manage the configuration of one or more nodes. For instance, the system and method provided by the present disclosure may automatically enable and disable a dual connectivity state of one or more nodes, according to the real-time or near real-time system status.

Further, example embodiments of the present disclosure provide a system and method to automatically check for abnormalities in configuration of one or more nodes, and to automatically address the abnormalities, if any.

Furthermore, example embodiments of the present disclosure provide a system and method to automatically determine an alternative network node based on determining that a UE is capable of utilizing multiple technologies but there is no node colocation detected.

Accordingly, example embodiments of the present disclosure avoid operational delay due to misconfiguration or inefficient task management. Further, the utilization of possible network nodes for dual connectivity may be maximized. Accordingly, the possibility of the icon indicator being inaccurate is effectively reduced.

Examples embodiments of the present disclosure are described below with reference to FIG. 3 to FIG. 13.

Figure 3:
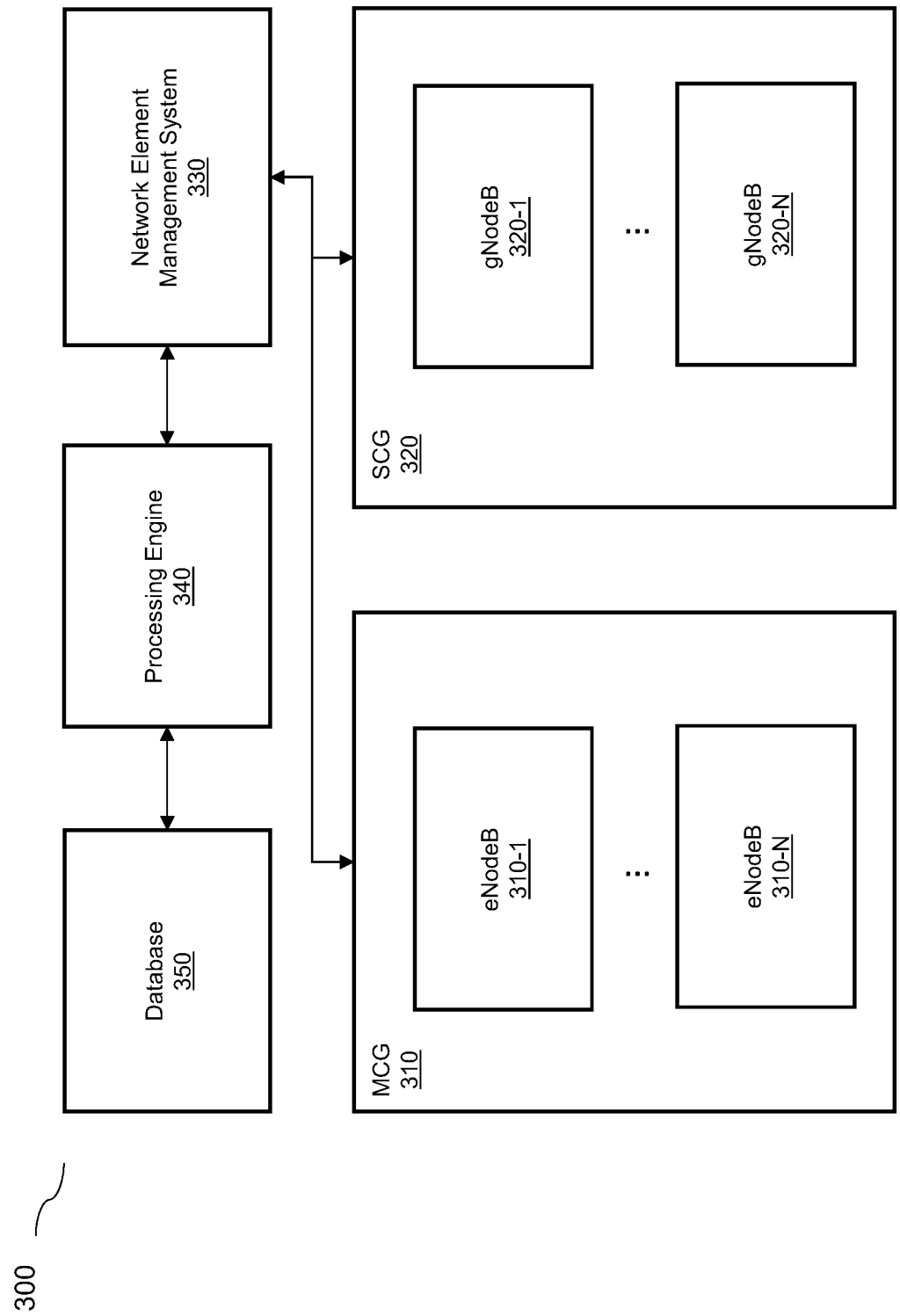
FIG. 3 illustrates an example block diagram of a system for managing configuration of one or more nodes, according to one or more embodiments.

FIG. 3 illustrates an example block diagram of a system 300 for managing configuration of one or more nodes, according to one or more embodiments. Referring to FIG. 3, system 300 may comprise a master cell group (MCG) 310, a secondary cell group (SCG) 320, a network element management system 330, a processing engine 340, and a database 350. Although it is illustrated in FIG. 3 that the network element management system 330, processing engine 340, and database 350 are separated from the nodes of MCG 310 and SCG 320, it is contemplated that one or more of the network element management system 330, processing engine 340, and database 350 may be implemented in one or more nodes of MCG 310 and/or SCG 320, without departing from the scope of the present disclosure.

The MCG 310 may comprise one or more nodes of a first technology, and the SCG 320 may comprise one or more nodes of a second technology. In the example embodiment illustrated in FIG. 3, the MCG 310 comprises one or more eNodeB 310-1 (i.e., 4G LTE base station) and the SCG 320 comprises one or more gNodeB 320-1 (i.e., 5G NR base station).

The network element management system 330 may be communicatively coupled to the MCG 310, the SCG 320 and the processing engine 340. In some embodiments, the network element management system 330 may be configured to receive information or instruction from the processing engine 340, and to configure one or more nodes in the MCG 310 and/or the SCG 320 based on the received information or instruction.

For instance, the network management system 330 may be configured to receive, from the processing engine 340, a configuration profile of a node, and may be configured to manage the node based on the configuration profile. By way of example, based on information of dual connectivity state (e.g., enabled, disabled, etc.) in the received configuration profile, the network management system 330 may be configured to enable or disable the dual connectivity state of the eNodeB of MCG 310 accordingly, so that the eNodeB may start or stop providing information of supported technology (e.g., sub-6 5G, mmWave 5G, etc.) and the associated requirement to the connected UEs.

Further, the network element management system 330 may be configured to continuously (or periodically) receive information (e.g., status information, etc.) from one or more nodes in the MCG 310 and/or SCG 320. For instance, when a new node is deployed for the first time, the node may provide associated node information (e.g., node ID, coordinate, deployment time stamp, etc.) to the network element management system 330. In another example, when a deployed node experiences changes (e.g., changes in antenna direction, changes in transmitting power, etc.), the deployed node may provide associated information to the network element management system 330. Accordingly, the network element management system 330 may provide the received information to the processing engine 340, and the processing engine 340 may store said information in database 350 thereafter. Alternatively, the network element management system 330 may be configured to communicatively couple to the database 350 and may directly store the received information in the database 350.

The network management system 330 may include an operational support system (OSS) and an element management system (EMS). In some embodiments, the network element management system 330 may include a plurality of EMSs, each of the plurality of EMSs may be configured to manage a single node or a group of nodes associated with a particular vendor/network service provider and/or associated with multiple technologies (e.g., LTE, 5G, etc.), and the OSS interfaces the plurality of EMSs and the processing engine 340. Accordingly, the network element management system 330 may provide a single control point for managing one or more nodes associated with multiple users (e.g., network operators, vendors, network service providers, etc.) and/or associated with multiple technologies via a centralized processing engine.

The processing engine 340 may be configured to obtain data or information from database 350 and to determine an appropriate node configuration based on the obtained data or information. Subsequently, the processing engine 340 may be configured to provide the determined node configuration to the network element management system 330, and the network element management system 330 may then configure the associated node(s) based on the determined node configuration. For instance, the network element management system 330 may be configured to request a latest configuration profile of a node (e.g. eNodeB) from the processing engine 340, and the processing engine 340 may be configured to obtain (from database 350) a configuration profile associated with the node, to determine whether or not the configuration information of the configuration profile is accurate or up-to-date, and to process or adjust the configuration profile to update or adjust the configuration information included therein if required. Subsequently, the processing engine 340 may provide the processed/adjusted configuration profile to the network management system 330 (or simply provide the obtained configuration profile without adjustment/processing based on determining that no processing or adjustment is required), and the network management system 330 may then configure the node according to the configuration profile provided by the processing engine 340.

In some embodiments, the processing engine 340 may comprise a rule-based processing engine, a network service orchestrator, or the like, which may be configured to provide end-to-end management automation (e.g., on-boarding, instantiation, redeployment, healing, scaling, termination, etc.) for one or more nodes.

The database 350 may comprise a plurality of storage mediums. In some embodiments, the database 350 may comprise a node inventory and a configuration management database (CMDB).

The node inventory may be configured to store information associated with one or more nodes in MCG 310 and SCG 320, such as but not limited to: node ID, MCG ID (when applicable), SCG ID (when applicable), cell ID, coordinates (e.g., latitude coordinate, longitude coordinate, etc.), azimuth (e.g., direction where an antenna of the node is pointing, etc.), physical cell identifier (PCI), transmit power (e.g., in dbm, etc.), technology type, and deployment type. The PCI may comprise a value within a predetermined range (e.g., 0 to 1008). The technology type may comprise LTE, 5G NR, or any other suitable technology. The deployment type may comprise sub-6 5G, mmWave 5G, or any other suitable deployment type for deploying the associated technology.

On the other hand, the CMDB may be configured to store information associated with the configuration of the nodes in MCG 310 and SCG 320. In some embodiments, the information associated with the configuration of each node may be stored in the form of a configuration profile, which may be a computer readable file, an electronic document, a metadata, or any other suitable data/file format for storing and presenting a number of settings and configuration details of the associated node. For instance, the CMDB may be configured to store configuration profile of each node in MCG 310 (referred to as "MCG configuration profile" hereinafter) and configuration profile of each nodes in SCG 320 (referred to as "SCG configuration profile" hereinafter).

The MCG configuration profile may comprise at least one of: information associated with the eNodeB such as eNodeB ID and Cell ID, information associated with the dual connectivity state (e.g., a flag defining an enabled state or a disabled state, etc.), information associated with the supported dual connectivity such as an ID of a dual connectivity profile mapped to the eNodeB, a supported dual connectivity deployment type, and the supported minimal dual connectivity configuration (i.e., configuration which may need to be satisfied in order to utilize the eNodeB for dual connectivity) such Absolute Radio Frequency Channel Number (ARFCN), dual connectivity threshold, trigger time, and the like.

FIG. 4 illustrates an example table containing a plurality of MCG configuration profiles, according to one or more embodiments. Referring to FIG. 4, an eNodeB may constitute one or more cells, may have one or more dual connectivity profiles mapped thereto, and may support one or more dual connectivity deployment types. For instance, eNB 1 may constitute two cells (i.e., eNB 1 may be a node in cell 1 and cell 2), may have Profile A1, Profile B1, and Profile A2 mapped thereto, and may support sub-6 and mmWave.

Further, a plurality of eNodeBs may have the same dual connectivity profile(s) mapped thereto, while said plurality of eNodeBs may have different requirement in minimal dual connectivity configuration which may lead to different dual connectivity state. For instance, both eNB 1 and eNB 2 have Profile A2 mapped thereto, while the minimal dual connectivity configuration of eNB 1 is configuration C and the minimal dual connectivity configuration of eNB 2 is configuration D. Accordingly, eNB1 may have the dual connectivity state disabled since configuration defined in Profile A2 does not satisfy the minimal dual connectivity configuration (i.e., configuration C), while eNB 2 may have the dual connectivity state enabled since configuration defined in Profile A2 satisfies the minimal dual connectivity configuration (i.e., configuration D).

On the other hand, the SCG configuration profile may comprise at least one of: information associated with the gNodeB such as gNodeB ID and Cell ID, information associated with the supported dual connectivity such as a profile ID to be mapped to one or more eNodeBs, a supported dual connectivity deployment type, and configuration for one or more dual connectivity parameters such Absolute Radio Frequency Channel Number (ARFCN), dual connectivity threshold, trigger time, and the like.

FIG. 5 illustrates an example table containing a plurality of SCG configuration profiles, according to one or more embodiments. It may be understood that the SCG configuration profiles illustrated in FIG. 5 may show only information related to dual connectivity supported by the gNodeB, and may omit other information, for conciseness.

In some embodiments, one gNodeB may comprise more than one SCG configuration profiles. For instance, a gNodeB which support both sub-6 technology and mm Wave technology may have one or more SCG configuration profile(s) associated with the supported sub-6 technology and may have one or more SCG configuration profile(s) associated with the supported mmWave. Further, the parameters illustrated in FIG. 5 may comprise parameters (such as ARFCN, dual connectivity threshold, trigger time, etc.) defining dual connectivity configuration of the gNodeB.

Whenever the gNodeB experiences any changes or update, the associated SCG configuration profile may be updated accordingly. For instance, when a user updates the dual connectivity trigger time of a gNodeB, the updated information may be provided by the gNodeB to the network element management system 330, and the network element management system 330 may be configured to instruct the processing engine 340 to retract the SCG configuration profile of said gNodeB and to update the dual connectivity trigger time in the SCG configuration profile accordingly. In this way, the dual connectivity configuration of the nodes in SCG may be continuously or periodically updated.

As will be further discussed below, the processing engine 340 may compare the dual connectivity configuration defined in a SCG configuration profile to the minimal dual connectivity configuration defined in a MCG configuration profile, so as to determine whether or not the information in the MCG configuration profile should be adjusted or updated. For instance, based on determining that a MCG configuration profile has Profile A1 (which supports "sub-6" dual connectivity deployment type) mapped thereto, but the dual connectivity deployment type recorded in the MCG configuration profile is "mmWave", the processing engine 340 may determine that the dual connectivity deployment type in the MCG configuration profile is inaccurate or is outdated, and may then be configured to update the dual connectivity deployment type in the MCG configuration profile from "mmWave" to "sub-6". It is apparent that a similar process may be applicable to other parameters or information (e.g., profile ID, trigger time, etc.) in managing and processing the configuration profiles.

In some embodiments, the dual connectivity information (e.g., dual connectivity state, profile ID, deployment type, minimal configuration, etc.) in the MCG configuration profile may be preset by a user (e.g. network operator, vendor, etc.), and said dual connectivity information may be verified and updated by the processing engine 340 thereafter. Alternatively, the dual connectivity information in the MCG configuration profile may be set to null or left empty by the user, and said information may be updated or provided by the processing engine 340 in operation.

The tables illustrated in FIG. 4 and FIG. 5 may be stored in the database 350 (e.g., may be stored in CMDB of database 350, etc.). It is apparent that the examples illustrated in FIG. 4 and FIG. 5 are merely exemplary for descriptive purposes and the present disclosure is not limited thereto. More or less information may be included, and the arrangement of the information may be different, without departing from the scope of the present disclosure. Further, it is contemplated that the node information (which is described as being stored in the node inventory) and the configuration profile (which is described as being stored in the CMDB) may be stored in the same storage medium.

The operations of managing configuration of one or more nodes will be described below with reference to FIG. 6 to FIG. 11.

Figure 6:
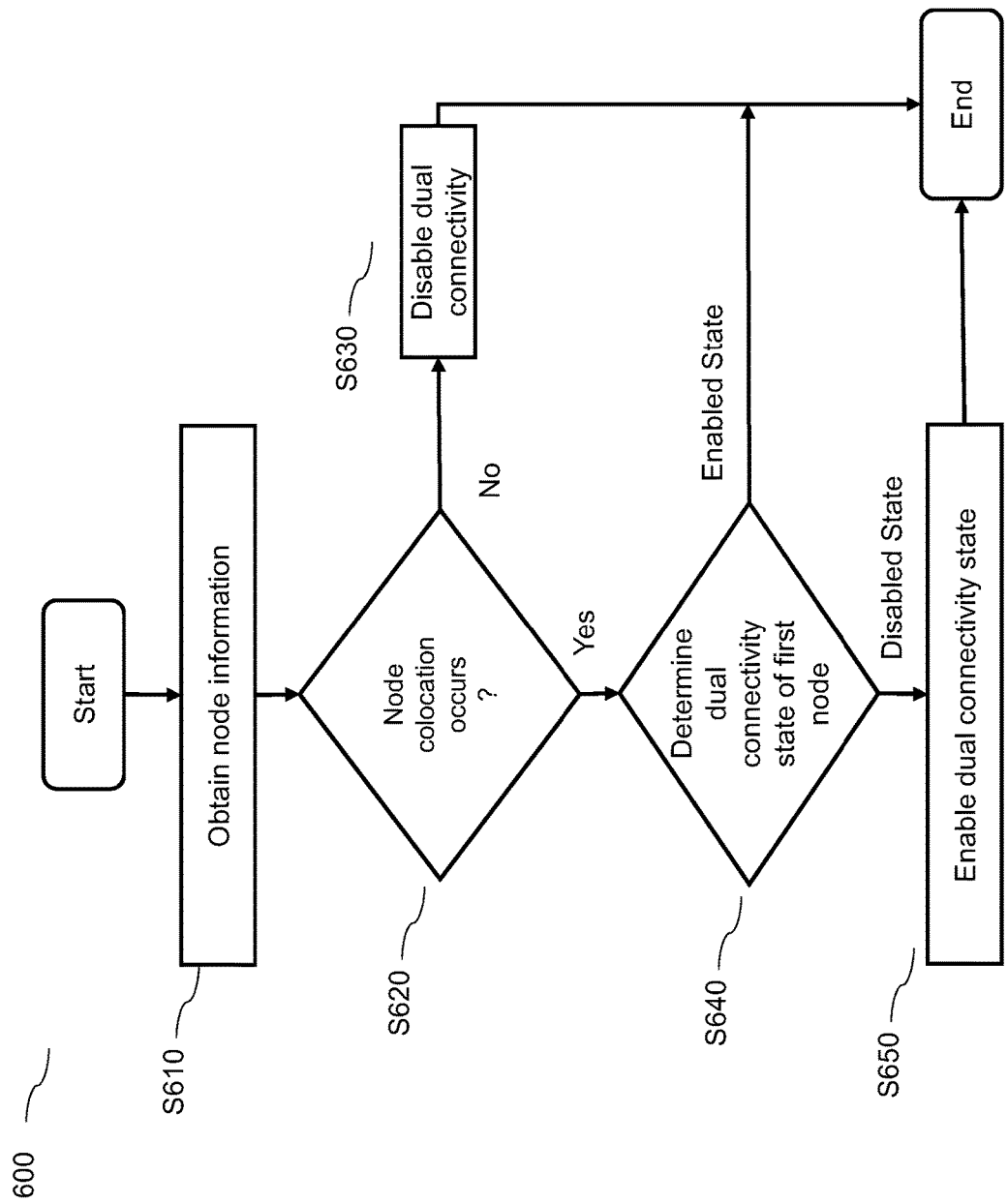
FIG. 6 illustrates an example flow diagram of a method for managing a configuration of one or more nodes, according to one or more embodiments.

FIG. 6 illustrates an example flow diagram of a method 600 for managing a configuration of one or more node, according to one or more embodiments. Method 600 may be performed by processing engine 340 in FIG. 3.

At operation S610, the processing engine 340 may be configured to obtain node information. For instance, the processing engine 340 may be configured to obtain the node information from node inventory of database 350. The node information may comprise information associated with a node, such as at least one of: coordinates (e.g., longitude coordinate, latitude coordinate, etc.), technology type (e.g., LTE, 5G, etc.), deployment type (e.g., LTE FDD, LTE TDD, 5G sub-6, 5G mmWave, etc.), node ID, cell ID, and the like.

In some embodiments, the node is a node of MCG, and the processing engine 340 may be configured to determine a MCG ID and to obtain the nodes information from the node inventory based on the MCG ID. In some embodiments, the processing engine 340 may be configured to obtain information of all MCG nodes and obtain information of SCG nodes associated with the MCG nodes. The term "first node" used hereinafter may refer to the node on which method 600 is performed.

At operation S620, the processing engine 340 may be configured to determine whether or not a node colocation occurs. The node colocation is a situation in which the first node can interoperate with at least one other node (referred to as "second node" hereinafter) with different technology. In an example use case in which the first node is an eNodeB, a node colocation may occur when the first node can interoperate with at least one gNodeB (e.g., via ENDC, etc.). To this end, at operation S620, the processing engine 340 may be configured to determine whether or not the node colocation occurs by determining whether or not the first node can be colocated with a second node (e.g., whether or not the first node can interoperate with the second node, etc.).

Based on determining that the node colocation occurs (i.e., the first node can be colocated with the second node), the process proceeds to operation S640. Otherwise, the process proceeds to operation S630.

At operation S630, the processing engine 340 may be configured to disable a dual connectivity state of the first node. Subsequently, the process ends.

At operation S640, the processing engine 340 may be configured to determine a dual connectivity state associated with the first node. Based on determining that the dual connectivity state is a disabled state, the process proceeds to operation S650, at which the processing engine 340 may be configured to enable the dual connectivity state. Otherwise, based on determining that the dual connectivity state is an enabled state, the process ends.

In some embodiments, instead of ending the process as illustrated in FIG. 6, the processing engine 340 may be configured to repeat method 600. For instance, after disabling the dual connectivity state at operation S630, after determining that the dual connectivity state has been enabled at operation S640, or after enabling the dual connectivity state at operation S650, the process may return to operation S610. In this way, the processing engine 340 may be configured to iteratively and/or periodically perform one or more operations of method 600, so as to ensure that the dual connectivity state of the first node is updated according to the latest information or status.

Figure 7:
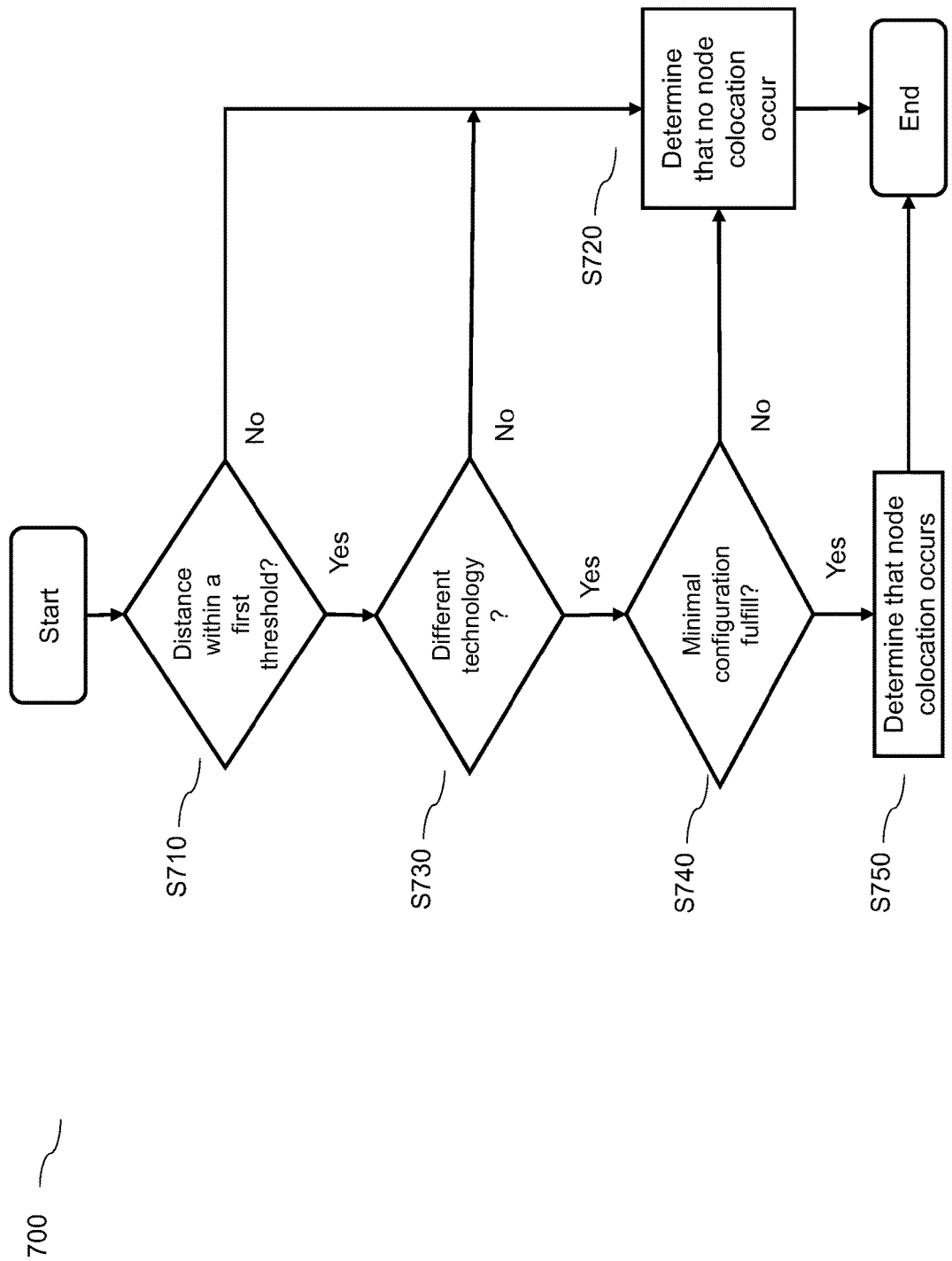
FIG. 7 illustrates an example flow diagram of a method for determining a node colocation, according to one or more embodiments.

FIG. 7 illustrates an example flow diagram of a method 700 for determining a node colocation, according to one or more embodiments. Method 700 may be part of operation S620 in FIG. 6, and may be performed by the processing engine 340.

Referring to FIG. 7, at operation S710, the processing engine 340 may be configured to determine whether or not a distance between the first node and the second node is within a first pre-determined threshold. Specifically, the processing engine 340 may be configured to compare a coordinate of the first node to a coordinate of the second node to determine the distance between the first node and the second node. Subsequently, the processing engine 340 may be configured to determine whether or not the distance between the first node and the second node is within the first pre-determined threshold (e.g., by comparing the distance to the first pre-determined threshold, etc.). In some embodiments, the first pre-determined threshold is a radius (e.g., in m, km, etc.) pre-defined by the network operator or vendor. The information of the coordinate of the first node and the second node may be pre-obtained by the processing engine 340 (e.g., pre-obtained at operation S610 in FIG. 6, etc.).

Based on determining that the distance is within the first pre-determined threshold, the process proceeds to operation S730. Otherwise, the process proceeds to operation S720, at which the processing engine 340 determines that no node colocation occur.

At operation S730, the processing engine 340 may be configured to determine whether or not a technology type of the second node is different from a technology type of the first node. For instance, assuming that the first node has a technology type of LTE, the processing engine 340 may be configured to determine whether or not the second node has a technology type different from LTE (e.g., 5G, etc.). The information of the technology type of the first node and the second node may be pre-obtained by the processing engine 340 (e.g., pre-obtained at operation S610, etc.).

Based on determining that the technology type of the second node is different from the technology type of the first node, the process proceeds to operation S740. Otherwise, the process proceeds to operation S720.

At operation S740, the processing engine 340 may be configured to determine whether or not a minimal dual connectivity configuration is fulfilled or satisfied. Specifically, the processing engine 340 may be configured to obtain (e.g., from the CMDB of database 350) a configuration profile of the first node (referred to as "the first configuration profile" hereinafter) and a configuration profile of the second node (referred to as "the second configuration profile" hereinafter), and may be configured to compare the first configuration profile to the second configuration profile.

In some embodiments, the processing engine 340 may be configured to obtain the first configuration profile based on the node ID and/or cell ID of the first node, and may be configured to obtain the second configuration profile based on the node ID and/or cell ID of the second node. When the first node is a MCG node and the second node is a SCG node, the processing engine 340 may be configured to obtain the first configuration profile based on the MCG ID, and may be configured to obtain the second configuration profile based on the SCG ID. Further, the processing engine 340 may be configured to obtain the second configuration profile based on a profile ID included in the first configuration profile of the first node.

The first configuration profile may be a MCG configuration profile described above in relation to FIG. 4, and the second configuration profile may be a SCG configuration profile described above in relation to FIG. 5. Accordingly, the first configuration profile may comprise a minimal dual connectivity configuration supported by the first node and the second configuration profile may comprise a dual connectivity configuration supported by the second node. Accordingly, at operation S740, the processing engine 340 may be configured to compare the first configuration profile to the second configuration profile, so as to determine whether or not the dual connectivity configuration supported by the second node fulfills the minimal dual connectivity configuration supported by the first node.

Based on determining that the minimal configuration is fulfilled, the process proceeds to operation S750, at which the processing engine 340 may be configured to determine that the node colocation occurs. Otherwise, the process proceeds to operation S720.

Figure 8:
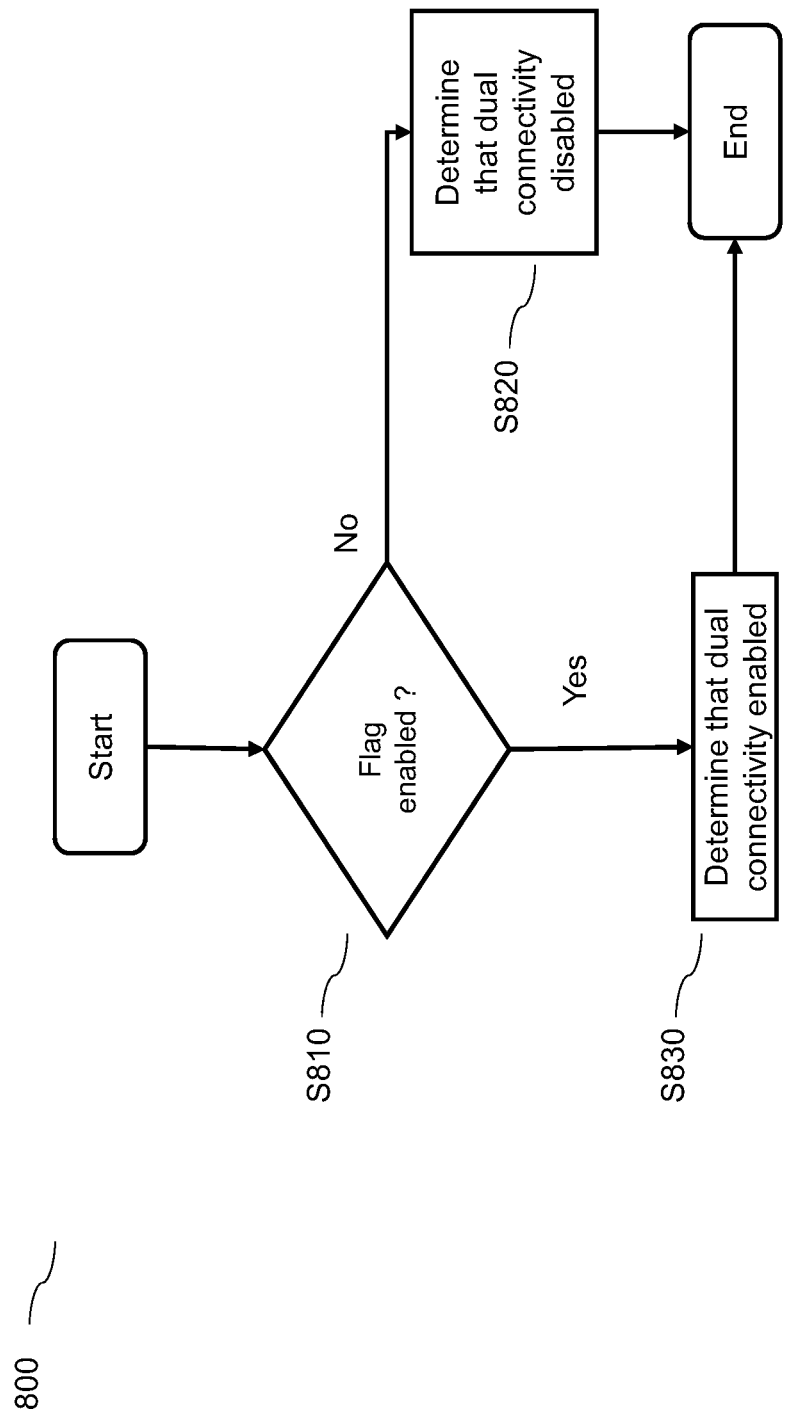
FIG. 8 illustrates an example flow diagram of a method for determining a dual connectivity state of a node, according to one or more embodiments.

FIG. 8 illustrates an example flow diagram of a method 800 for determining a dual connectivity state of a node, according to one or more embodiments. Method 800 may be part of operation S640 in FIG. 6, and may be performed by the processing engine 340.

Referring to FIG. 8, at operation S810, the processing engine 340 may be configured to determine a state of a flag associated with the dual connectivity state. For instance, the processing engine 340 may be configured to determine whether the flag has a state of "true"/"enabled" or a state of "false"/"disabled". The state of the flag may be pre-configured by the user (e.g., before the node is deployed), and/or may be configured by the processing engine 340 (e.g., after the node has been deployed). The information of the flag may be included in a pre-obtained configuration profile (e.g., first configuration profile obtained in operation S740 in FIG. 7, which may be part of operation S620 in FIG. 6.).

Based on determining that the flag has the state of "false" or "disabled", the process proceeds to operation S820, at which the processing engine 340 may determine that the dual connectivity state is a disabled state, and the dual connectivity is disabled. Conversely, based on determining that the flag has the state of "true" or "enabled", the process proceeds to operation S830, at which the processing engine 340 may determine that the dual connectivity state is an enabled state, and the dual connectivity is enabled.

Figure 9:
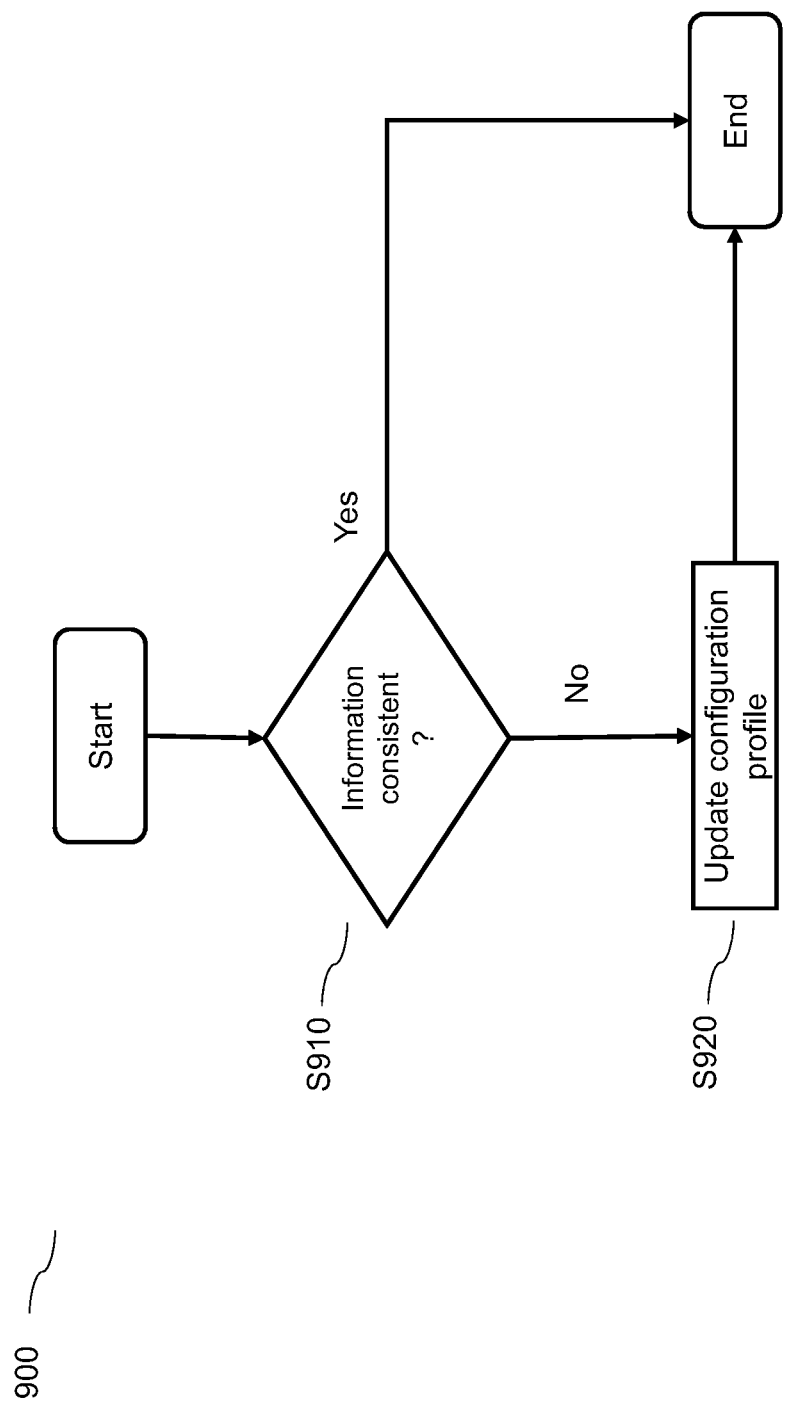
FIG. 9 illustrates an example flow diagram of a method for managing a configuration profile, according to one or more embodiments.

FIG. 9 illustrates an example flow diagram of a method 900 for managing a configuration profile, according to one or more embodiments. Method 900 may be performed by the processing engine 340. Further, method 900 may be performed subsequent to operation S650, after enabling the dual connectivity state of the first node. The first configuration profile and the second configuration profile involved in method 900 may be pre-obtained by the processing engine 340 (e.g., pre-obtained at operation S740, etc.).

Referring to FIG. 9, at operation S910, the processing engine 340 may be configured to determine whether or not an information in the first configuration profile is consistent with an information in the second configuration profile.

For instance, the processing engine 340 may be configured to determine whether or not the dual connectivity profile ID included in the first configuration profile is consistent with the dual connectivity profile ID included in the second configuration profile. Further, the processing engine 340 may also be configured to determine whether or not the dual connectivity deployment type in the first configuration profile is consistent with the dual connectivity deployment type in the second configuration profile. Similarly, the processing engine 340 may also be configured to determine whether or not the minimal dual connectivity configuration in the first configuration profile is consistent with configuration of one or more parameters in the second configuration profile.

Based on determining that the information in the first configuration profile is not consistent with the information in the second configuration profile, the process proceeds to operation S920, at which the processing engine 340 may be configured to update the information of the first configuration profile according to the information of the second configuration profile. For instance, the processing engine 340 may be configured to update the profile ID in the first configuration profile with the profile ID in the second configuration profile, to update the deployment type in the first configuration profile with the deployment type in the second configuration profile, and/or to update the minimal configuration in the configuration profile with one or more configurations in the second configuration profile.

Figure 10:
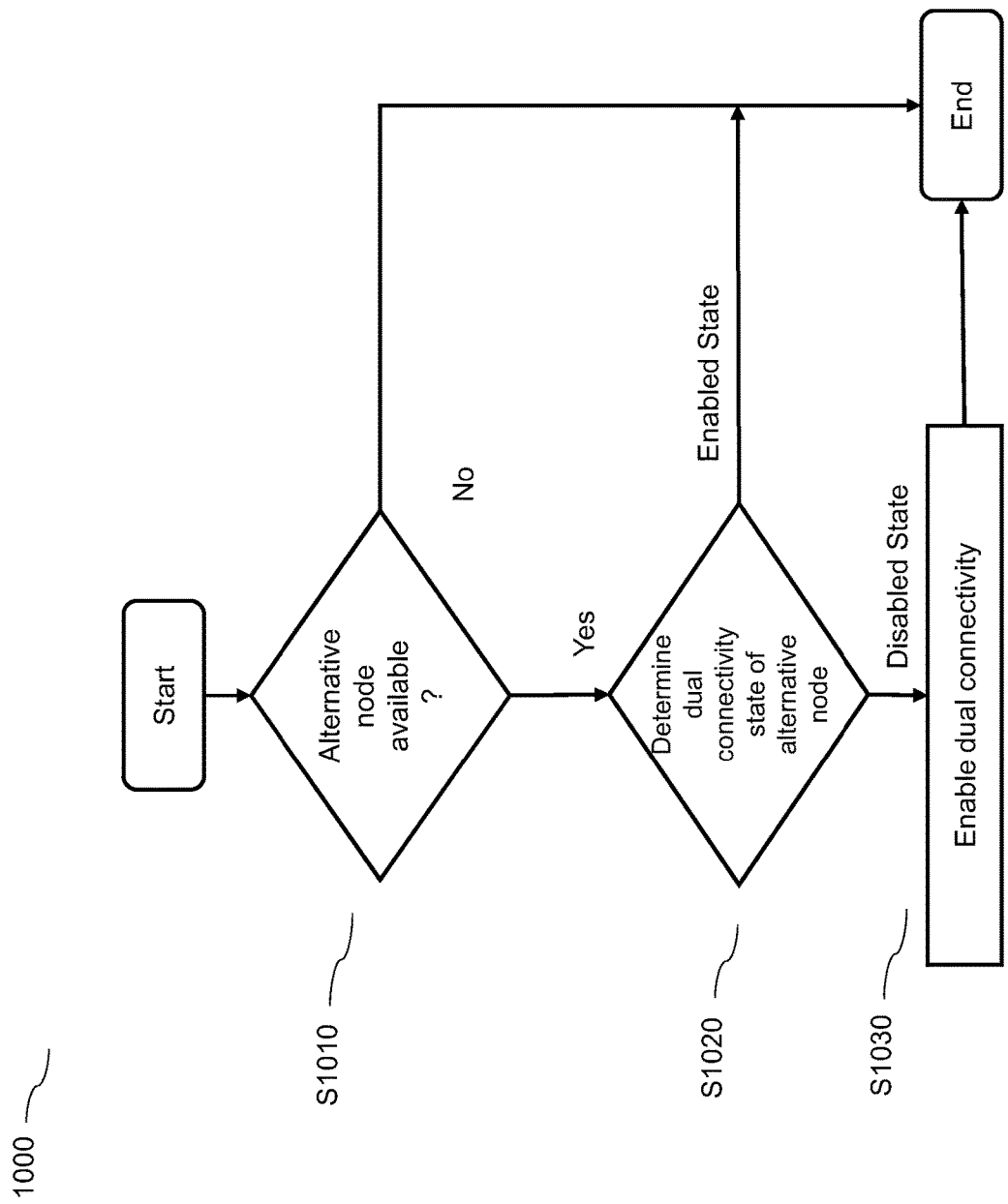
FIG. 10 illustrates an example flow diagram of a method for configuring an alternative node, according to one or more embodiments.

FIG. 10 illustrates an example flow diagram of a method 1000 for configuring an alternative node, according to one or more embodiments. Method 1000 may be performed by the processing engine 340. Further, method 1000 may be performed subsequent to operation S620 in FIG. 6, after determining that node colocation does not occur (i.e., the first node cannot be colocated with the second node). Alternatively, method 1000 may be performed subsequent to operation S650 in FIG. 6 upon requested by the user.

Referring to FIG. 10, at operation S1010, the processing engine 340 may be configured to determine whether or not one or more alternative nodes (e.g., a third node, a fourth node, etc.) is available. As will be further discussed in detail below, the alternative node may be a node nearby the first node and/or the second node, which may be a possible node for replacing the first node to establish dual connectivity with the second node or for replacing the second node to establish dual connectivity with the first node.

Based on determining that there is an available alternative node, the process proceeds to operation S1020, at which the processing engine 340 may be configured to determine a dual connectivity state of the alternative node. Otherwise, the process may end. Operation S1020 may be similar to operation S640 in FIG. 6, thus redundant descriptions associated therewith may be omitted below for conciseness.

Based on determining that the dual connectivity state of the alternative node is a disabled state, the process proceeds to operation S1030, at which the processing engine 340 may be configured to enable the dual connectivity state of the alternative node. Otherwise, the process may end. Operation S1030 may be similar to operation S650 in FIG. 6, thus redundant descriptions associated therewith may be omitted below for conciseness.

Figure 11:
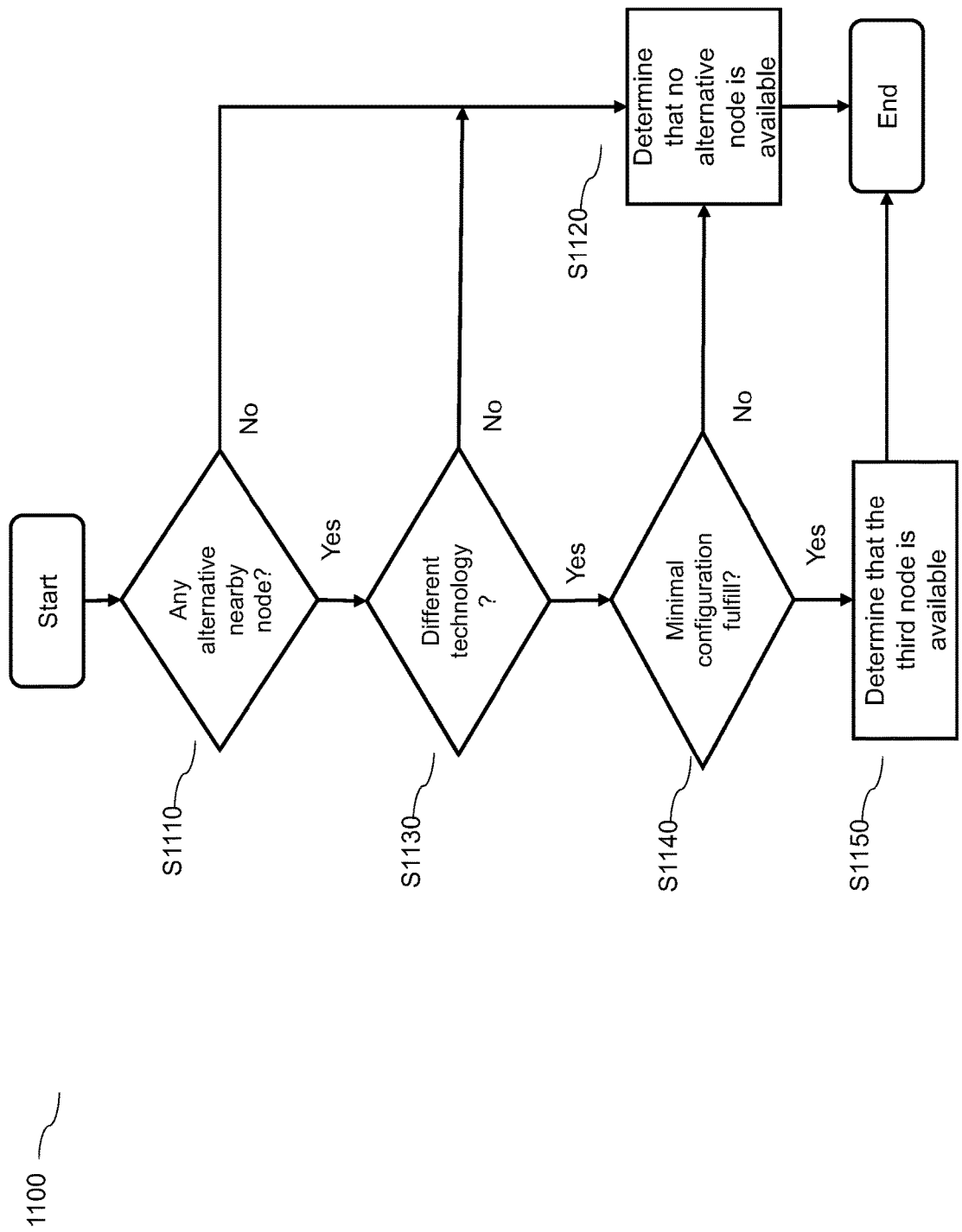
FIG. 11 illustrates an example flow diagram of a method for determining availability of an alternative node, according to one or more embodiments.

FIG. 11 illustrates an example flow diagram of a method 1100 for determining availability of an alternative node, according to one or more embodiments. Method 1100 may be part of operation S1010 in FIG. 10, and may be performed by the processing engine 340.

Referring to FIG. 11, at operation S1110, the processing engine 340 may be configured to determine whether or not there is any alternative node nearby the first node and/or the second node. For instance, the processing engine 340 may be configured to obtain coordinate information (e.g., longitude coordinate, latitude coordinate, etc.) of all nodes from the node inventory of database 350, and to compare coordinates of each of the nodes to coordinates of the first node and/or the second node, so as to determine a distance between each of the nodes and the first node and/or the second node.

For descriptive purposes, in the following descriptions, it will be assumed that coordinate information of a third node is obtained and is compared to coordinates of the first node and/or the second node, and the distance between the third node and the first node and/or the second node is determined accordingly. In this regard, at operation S1110, the processing engine 340 may be configured to determine whether or not the distance between the third node and the first node and/or the second node is within a second pre-determined threshold. Similar to the first pre-determined threshold described above in relation to operation S710 in FIG. 7, the second pre-determined threshold may be pre-set by the user. Nevertheless, the second pre-determined threshold may have a value be larger than the first pre-determined threshold, such that a larger area/radius can be utilized in determining nearby alternative node(s).

Based on determining that the distance of a node(s) is within the second pre-determined threshold, the processing engine 340 may determines that there is an alternative node(s) nearby, and the process proceeds to operation S1130. Otherwise, the process proceeds to operation S1120, at which the processing engine 340 may be configured to determine that no alternative node is available. In some embodiments, based on determining that there is no available alternative node, the processing engine 340 may be configured to increase the value of the second pre-determined threshold (such that more nodes may be determined) and the process returns to operation S1110, at which the processing engine 340 may be configured to again determine whether or not there is any nearby alternative node. The process may be repeated by the processing engine 340 until an alternative node is detected, until a predetermined maximum value of the second predetermined threshold is reached, or until all nodes have been considered.

Referring still to FIG. 11, at operation S1130, the processing engine 340 may be configured to determine whether or not the third node (i.e., the nearby node) has a technology different from the first node or the second node. As described above, node colocation occurs when two nodes with different technology interoperate with each other. Thus, in the case in which the processing engine 340 is configured to determine an alternative node for the first node, the processing engine 340 may be configured to determine whether or not the third node has a technology different from the first node. Similarly, in the case in which the processing engine 340 is configured to determine an alternative node for the second node, the processing engine 340 may be configured to determine whether or not the third node has a technology different from the second node.

Based on determining that the third node has a technology different from the first node or the second node, the process proceeds to operation S1140. Otherwise, the process proceeds to operation S120.

At operation S1140, the processing engine may be configured to determine whether or not a minimal dual connectivity configuration is fulfilled. Specifically, in the case in which the processing engine 340 is configured to determine an alternative node for the first node, the processing engine 340 may be configured to obtain a configuration of the third node (referred to as "third configuration profile" hereinafter) and compare the dual connectivity configuration in the third configuration profile to the minimal dual connectivity configuration profile in the first configuration profile. On the other hand, in the case in which the processing engine 340 is configured to determine an alternative node for the second node, the minimal dual connectivity configuration will be included in the third configuration profile since the third node may be a MCG node. In this regard, the processing engine 340 may be configured to compare the dual connectivity configuration in the second configuration profile to the minimal dual connectivity configuration profile in the third configuration profile. The operation of comparing the configuration profiles may be similar to operation S740 in FIG. 7, thus redundant descriptions associated therewith may be omitted below for conciseness.

The methods described above in relation to FIG. 6 to FIG. 11 may be performed by the processing engine 340 under different situations. For instance, the processing engine 340 may be configured to perform said methods on a new node (i.e., a node which is newly deployed in the network), so as to provide initial dual connectivity configuration to the new node. Alternatively, the processing engine 340 may be configured to perform said methods on a deployed node, so as to monitor the deployed node and to update or adjust the dual connectivity configuration of the deployed node when required.

On the other hand, the processing engine 340 may be configured to perform said methods on multiple nodes. For instance, the processing engine 340 may be configured to perform method 600 on all nodes in a MCG. In this case, the processing engine 340 may be configured to obtain information of all nodes in the MCG from the node inventory of the database 350 and to perform operations S620-S650 for each node in the MCG.

It is apparent that the example embodiments described hereinabove may also be implemented in other suitable manners, without departing from the scope of the present disclosure.

Example embodiments of the present embodiments allow the configuration of a node to be automatically managed. For instance, the dual connectivity state of the node may be automatically adjusted (i.e., enabled or disabled) according to the latest network status and information. Further, any anomaly or inconsistency in the dual connectivity configuration may be automatically detected and the associated configuration may be automatically adjusted. Thus, any delay in providing dual connectivity service due to misconfiguration or late configuration by the user can be avoided. Further, the involvement of the user in managing the configuration of the node can be reduced, which in turn reduces the burden of the user, reduces the time and cost required in manually managing the configuration of the node, and reduces the human errors made by the users.

Further, example embodiments of the present disclosure automatically determine alternative node and automatically configure the alternative node to provide dual connectivity service, in case a node colocation does not occur or no node colocation is detected. Accordingly, example embodiments of the present disclosure increase the rate of dual connectivity provision, which may in turn provide a UE as much dual connectivity as possible.

In view of the above, example embodiments of the present disclosure may effectively reduce the rate of presenting a false or inaccurate technology icon indicator on the UE, since the rate of incorrect configuration (which leads to a node which support dual connectivity unable to provide dual connectivity service) can be effectively reduced, and the rate of dual connectivity provision may be effectively increased.

Figure 12:
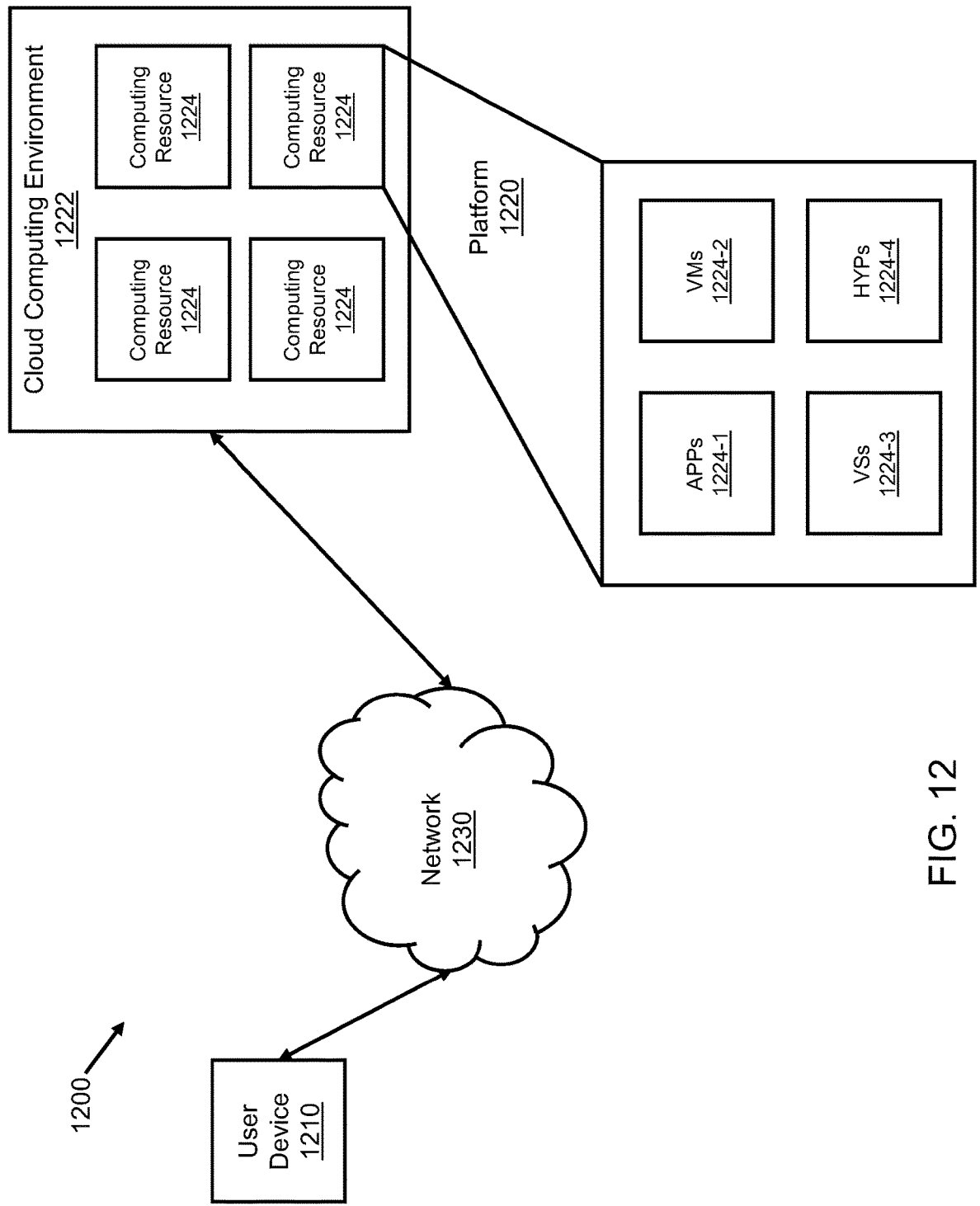
FIG. 12 is a diagram of an example environment in which systems and/or methods, described herein, may be implemented.

FIG. 12 is a diagram of an example environment 1200 in which systems and/or methods, described herein, may be implemented. As shown in FIG. 12, environment 1200 may include a user device 1210, a platform 1220, and a network 1230. Devices of environment 1200 may interconnect via wired connections, wireless connections, or a combination of wired and wireless connections. In embodiments, any of the functions and operations described with reference to FIG. 3 through FIG. 11 above may be performed by any combination of elements illustrated in FIG. 12.

User device 1210 includes one or more devices capable of receiving, generating, storing, processing, and/or providing information associated with platform 1220. For example, user device 1210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 1210 may receive information from and/or transmit information to platform 1220. In some embodiments, user device 1210 may corresponds to the user equipment (UE) described above in relation to FIG. 3 through FIG. 11.

Platform 1220 includes one or more devices capable of receiving, generating, storing, processing, and/or providing information. In some implementations, platform 1220 may include a cloud server or a group of cloud servers. In some implementations, platform 1220 may be designed to be modular such that certain software components may be swapped in or out depending on a particular need. As such, platform 1220 may be easily and/or quickly reconfigured for different uses. In some embodiments, one or more of database 350, processing engine 340, and network element management system 330 may be implemented in platform 1220.

In some implementations, as shown, platform 1220 may be hosted in cloud computing environment 1222. Notably, while implementations described herein describe platform 1220 as being hosted in cloud computing environment 1222, in some implementations, platform 1220 may not be cloud-based (i.e., may be implemented outside of a cloud computing environment) or may be partially cloud-based.

Cloud computing environment 1222 includes an environment that hosts platform 1220. Cloud computing environment 1222 may provide computation, software, data access, storage, etc. services that do not require end-user (e.g., user device 1210) knowledge of a physical location and configuration of system(s) and/or device(s) that hosts platform 1220. As shown, cloud computing environment 1222 may include a group of computing resources 1224 (referred to collectively as "computing resources 1224" and individually as "computing resource 1224").

Computing resource 1224 includes one or more personal computers, a cluster of computing devices, workstation computers, server devices, or other types of computation and/or communication devices. In some implementations, computing resource 1224 may host platform 1220. The cloud resources may include compute instances executing in computing resource 1224, storage devices provided in computing resource 1224, data transfer devices provided by computing resource 1224, etc. In some implementations, computing resource 1224 may communicate with other computing resources 1224 via wired connections, wireless connections, or a combination of wired and wireless connections.

As further shown in FIG. 12, computing resource 1224 includes a group of cloud resources, such as one or more applications ("APPs") 1224-1, one or more virtual machines ("VMs") 1224-2, virtualized storage ("VSs") 1224-3, one or more hypervisors ("HYPs") 1224-4, or the like.

Application 1224-1 includes one or more software applications that may be provided to or accessed by user device 1210. Application 1224-1 may eliminate a need to install and execute the software applications on user device 1210. For example, application 1224-1 may include software associated with platform 1220 and/or any other software capable of being provided via cloud computing environment 1222. In some implementations, one application 1224-1 may send/receive information to/from one or more other applications 1224-1, via virtual machine 1224-2.

Virtual machine 1224-2 includes a software implementation of a machine (e.g., a computer) that executes programs like a physical machine. Virtual machine 1224-2 may be either a system virtual machine or a process virtual machine, depending upon use and degree of correspondence to any real machine by virtual machine 1224-2. A system virtual machine may provide a complete system platform that supports execution of a complete operating system ("OS"). A process virtual machine may execute a single program, and may support a single process. In some implementations, virtual machine 1224-2 may execute on behalf of a user (e.g., user device 1210), and may manage infrastructure of cloud computing environment 1222, such as data management, synchronization, or long-duration data transfers.

Virtualized storage 1224-3 includes one or more storage systems and/or one or more devices that use virtualization techniques within the storage systems or devices of computing resource 1224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1224-4 may provide hardware virtualization techniques that allow multiple operating systems (e.g., "guest operating systems") to execute concurrently on a host computer, such as computing resource 1224. Hypervisor 1224-4 may present a virtual operating platform to the guest operating systems, and may manage the execution of the guest operating systems. Multiple instances of a variety of operating systems may share virtualized hardware resources.

Network 1230 includes one or more wired and/or wireless networks. For example, network 1230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 800.

FIG. 13 is a diagram of example components of a device 1300. Device 1300 may correspond to user device 1210 and/or platform 1220, and may correspond to one or more elements illustrated in FIG. 3. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 may be implemented in hardware, firmware, or a combination of hardware and software. Processor 1320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, or the like.

Device 1300 may perform one or more processes described herein. Device 1300 may perform these processes in response to processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus comprising:
   a memory storing instructions; and
   at least one processor configured to execute the instructions to:
      determine whether or not a node colocation occurs between a first node and a second node;
      based on determining that the node colocation occurs, determine a dual connectivity state associated with the first node;
      based on determining that the dual connectivity state is a disabled state, enable the dual connectivity state; and
      based on determining that no node colocation occurs, disable the dual connectivity state.

2. The apparatus as claimed in claim 1, wherein the at least one processor is further configured to execute the instructions to:
   obtain a first configuration profile associated with the first node; and
   obtain a second configuration profile associated with the second node.

3. The apparatus as claimed in claim 2, wherein the first configuration profile comprises a minimal dual connectivity configuration requirement of the first node, wherein the second configuration profile comprises a dual connectivity configuration of the second node, and wherein the at least one processor is configured to execute the instructions to determine whether or not the node colocation occurs by:
   determining whether or not a distance between the first node and the second node is within a first predetermined threshold;
   based on determining that the distance is within the first predetermined threshold, determining whether or not a technology type of the second node is different from a technology type of the first node;
      based on determining that the technology type of the second node is different from the technology type of the first node, determining whether or not the dual connectivity configuration of the second node satisfies the minimal dual connectivity configuration requirement;
      based on determining that the dual connectivity configuration of the second node satisfies the minimal dual connectivity configuration requirement, determining that the node colocation occurs; and
   based on determining that the distance is not within the first predetermined threshold, based on determining that the technology type of the second node is not different from the technology type of the first node, or based on determining that the dual connectivity configuration of the second node does not satisfy the minimal dual connectivity configuration requirement, determining that no node colocation occurs.

4. The apparatus as claimed in claim 2, wherein the first configuration profile comprises a flag defining the dual connectivity state associated with the first node, wherein the at least one processor is configured to execute the instructions to determine the dual connectivity state by determining a state of the flag.

5. The apparatus as claimed in claim 2, wherein the at least one processor is configured to execute the instructions to:
   determine whether or not an information in the first configuration profile is consistent with an information in the second configuration profile; and
   based on determining that the information in the first configuration is not consistent with the information in the second configuration profile, update the information of the first configuration profile according to the information in the second configuration profile.

6. The apparatus as claimed in claim 2, wherein the at least one processor is configured to execute the instructions to:
   determine whether or not a third node is available;
   based on determining that the third node is available, determine a dual connectivity state associated with the third node; and
   based on determining that the dual connectivity state associated with the third node is a disabled state, enable the dual connectivity state associated with the third node.

7. The apparatus as claimed in claim 6, wherein the at least one processor is configured to execute the instructions to determine whether or not the third node is available by:
   comparing a coordinate of the third node to a coordinate of the second node to determine a distance between the third node and the second node;
   determining whether or not the distance between the third node and the second node is within a second predetermined threshold;
   based on determining that the distance is within the second predetermined threshold, determining whether or not a technology type of the third node is different from a technology type of the second node; and
   based on determining that the technology type of the third node is different from the technology type of the second node, determining that the third node is available.

8. The apparatus as claimed in claim 6, wherein the at least one processor is configured to execute the instructions to enable the dual connectivity state associated with the third node by:
   obtaining a third configuration profile associated with the third node, wherein the third configuration profile comprises a flag defining the dual connectivity state associated with the third node;
   determining a state of the flag; and
   based on determining that the flag has a disabled state, enabling the flag.

9. The apparatus as claimed in claim 8, wherein the at least one processor is configured to execute the instructions to:
   determine whether or not an information in the third configuration profile is consistent with an information in the second configuration profile; and
   based on determining that the information in the third configuration is not consistent with the information in the second configuration profile, update the information of the third configuration profile according to the information in the second configuration profile.

10. A method, performed by at least one processor, comprising:
   determining whether or not a node colocation occurs between a first node and a second node;
   based on determining that the node colocation occurs, determining a dual connectivity state associated with the first node;
   based on determining that the dual connectivity state is a disabled state, enabling the dual connectivity state; and
   based on determining that no node colocation occurs, disabling the dual connectivity state.

11. The method as claimed in claim 10, wherein the method further comprising:
   obtaining a first configuration profile associated with the first node; and
   obtaining a second configuration profile associated with the second node.

12. The method as claimed in claim 11, wherein the first configuration profile comprises a minimal dual connectivity configuration requirement of the first node, wherein the second configuration profile comprises a dual connectivity configuration of the second node, and wherein the determining whether or not the node colocation occurs comprising:
   determining whether or not a distance between the first node and the second node is within a first predetermined threshold;
   based on determining that the distance is within the first predetermined threshold, determining whether or not a technology type of the second node is different from a technology type of the first node;
      based on determining that the technology type of the second node is different from the technology type of the first node, determining whether or not the dual connectivity configuration of the second node satisfies the minimal dual connectivity configuration requirement;
      based on determining that the dual connectivity configuration of the second node satisfies the minimal dual connectivity configuration requirement, determining that the node colocation occurs; and
      based on determining that the distance is not within the first predetermined threshold, based on determining that the technology type of the second node is not different from the technology type of the first node, or based on determining that the dual connectivity configuration of the second node does not satisfy the minimal dual connectivity configuration requirement, determining that no node colocation occurs.

13. The method as claimed in claim 11, wherein the first configuration profile comprises a flag defining the dual connectivity state associated with the first node, wherein the determining the dual connectivity state comprising determining a state of the flag.

14. The method as claimed in claim 11, further comprising:
   determining whether or not an information in the first configuration profile is consistent with an information in the second configuration profile; and
   based on determining that the information in the first configuration is not consistent with the information in the second configuration profile, updating the information of the first configuration profile according to the information in the second configuration profile.

15. The method as claimed in claim 11, further comprising:
   determining whether or not a third node is available;
   based on determining that the third node is available, determining a dual connectivity state associated with the third node; and
   based on determining that the dual connectivity state associated with the third node is a disabled state, enabling the dual connectivity state associated with the third node.

16. The method as claimed in claim 15, wherein the determining whether or not the third node is available comprising:
   comparing a coordinate of the third node to a coordinate of the second node to determine a distance between the third node and the second node;
   determining whether or not the distance between the third node and the second node is within a second predetermined threshold;
   based on determining that the distance is within the second predetermined threshold, determining whether or not a technology type of the third node is different from a technology type of the second node; and
   based on determining that the technology type of the third node is different from the technology type of the second node, determining that the third node is available.

17. The method as claimed in claim 15, wherein the enabling the dual connectivity state associated with the third node comprising:
   obtaining a third configuration profile associated with the third node, wherein the third configuration profile comprises a flag defining the dual connectivity state associated with the third node;
   determining a state of the flag; and
   based on determining that the flag has a disabled state, enabling the flag.

18. The method as claimed in claim 17, further comprising:
   determining whether or not an information in the third configuration profile is consistent with an information in the second configuration profile; and
   based on determining that the information in the third configuration is not consistent with the information in the second configuration profile, updating the information of the third configuration profile according to the information in the second configuration profile.

19. A non-transitory computer-readable recording medium having recorded thereon instructions executable by at least one processor to cause the at least one processor to perform a method comprising:
   determining whether or not a node colocation occurs between a first node and a second node;
   based on determining that the node colocation occurs, determining a dual connectivity state associated with the first node;
   based on determining that the dual connectivity state is a disabled state, enabling the dual connectivity state; and
   based on determining that no node colocation occurs, disabling the dual connectivity state.

20. The non-transitory computer-readable recording medium as claimed in claim 19, wherein the method further comprising:
   obtaining a first configuration profile associated with the first node; and obtaining a second configuration profile associated with the second node.

\* \* \* \* \*